(No Model.)  2 Sheets—Sheet 1.
A. PFUND.
Mashing Machine and Mixer for Brewer's Use.
No. 241,715. Fig.1. Patented May 17, 1881.
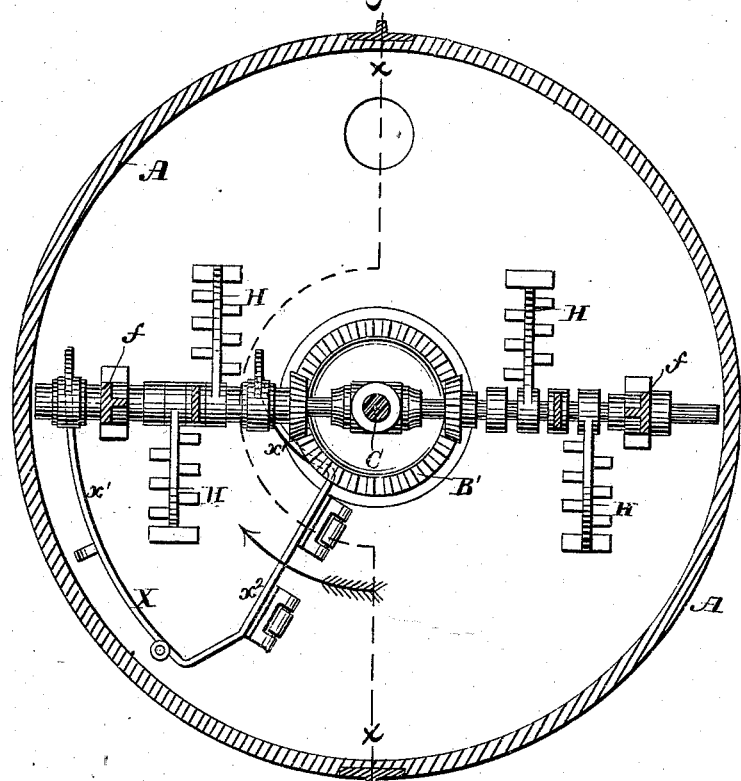
Fig.2.
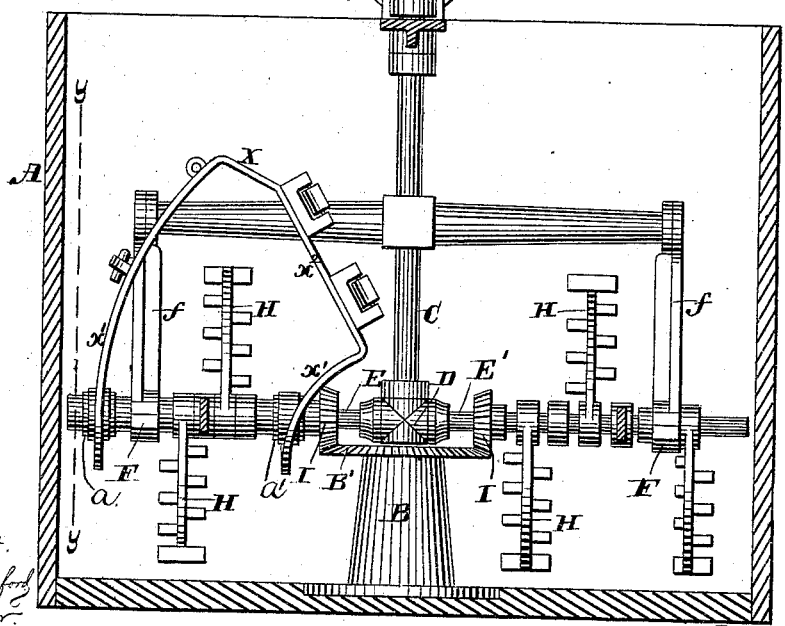
Attest.
J. A. Rutherford
J. H. Kaiser
Inventor
Anthony Pfund
By Adam E. Schatz Atty (No Model.) 2 Sheets—Sheet 2.
A. PFUND.
Mashing Machine and Mixer for Brewer's Use.
No. 241,715. Patented May 17, 1881.
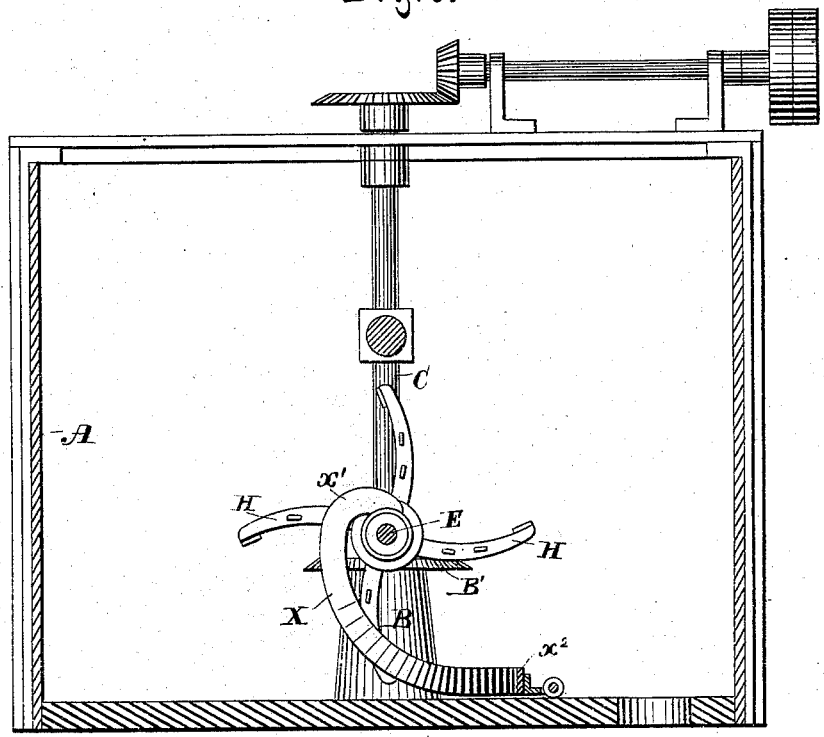
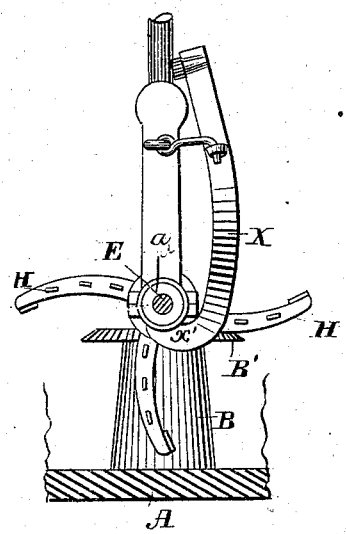
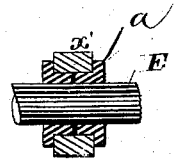
Witnesses.
J. A. Rutherford
J. H. Kaiser
Inventor.
Anthony Pfund
By Adam E. Schatz
Atty.

UNITED STATES PATENT OFFICE.

ANTHONY PFUND, OF NEW YORK, N. Y.

MASHING-MACHINE AND MIXER FOR BREWERS' USE.

SPECIFICATION forming part of Letters Patent No. 241,715, dated May 17, 1881.

Application filed November 9, 1880. (No model.)

*To all whom it may concern:*

Be it known that I, ANTHONY PFUND, a citizen of the United States, residing at the city, county, and State of New York, have invented certain new and useful Improvements in Mashing Machines and Mixers for Brewers' Use, of which the following is a specification.

The object of my invention is, in an ordinary mash-machine, to provide means by which the tun, after the operation of mashing has been performed, can be readily and efficiently emptied of its contents without manual labor being required.

Heretofore, when it became necessary to empty the tun of its contents, usually two or three workmen, having first stripped to the waist, entered the tun, and with the aid of shovels threw the contents or "grains," as they are usually called, through a man-hole provided for that purpose in or near the bottom of the tun. This was very dangerous, severe, and exhausting to the workmen.

In the drawings, Figure 1 is a horizontal section of a tun and its mashing mechanism, showing the drag when in working position. Fig. 2 is a vertical cross-section when the drag is raised. Fig. 3 is a vertical cross-section when taken on the line $x$ $x$ of Fig. 1. Fig. 4 is a section on line $y$ $y$ of Fig. 2. Fig. 5 shows a collar by means of which the drag is loosely mounted on the shaft.

A is a mash-tub of the usual shape.

B is a hub or standard, provided with a fixed bevel-gearing, B', and having a bearing for receiving a vertical shaft, C, and which is provided on top with a suitable bearing, which forms the axial or operating shaft of the machine. Fixed to the lower part of the axial shaft is a box, D, which receives the ends of the horizontal shafts E E', the opposite ends of which are carried by bearings F F, provided in the depending arms or brackets $ff$, attached to and carried by the axial shaft.

The shafts E are furnished with radial arms or beaters H, and have on their inner ends a bevel-pinion, I, which gears into the beveled gear B', so that when the shafts are whirled around in a horizontal plane by the rotation of the axial shaft a rapid rotary motion is imparted to the shafts E E' and to the beaters on the said shafts. The compound motion thus imparted to the beaters gives them a very efficient mixing-power, as they are rapidly rotated in the tun.

The shaft E is provided with collars $a$ $a'$, upon which the ends of the drag X are hung, which collars are made in two parts, fitting eyes in the ends of the drag, and are held in position by suitable means. These collars provide a loose bearing for the drag, and serve as a means of suspending the same from the shaft E, and, further, in swinging the drag upward they serve to prevent direct friction between the drag and the shaft.

The arms $x'$ $x'$ of the drag are so shaped at the ends nearest the shaft that when the drag is in operation the part $x^2$ will be on a line with the bottom of the tun. The inner arm of the drag is somewhat shorter than the outer arm, and is so arranged that when in operation the drag tends to throw the grains toward the outer end of the drag.

The drag X has at the part $x^2$ affixed flat feet or bearing parts, which, in turn, have anti-friction rollers, and also a friction-roller on the outer arm. The object of these flat feet is twofold: first, they prevent the drag from sinking too deep into the grains while in operation, and, second, the rollers thereto attached act as friction-rollers when the tun is emptied.

Tuns as now constructed are provided with a removable perforated false bottom, which performs the function of a strainer, to allow the fluid to be run off without carrying with it the grains. These bottoms are very apt to be raised at the edges, and so catch or interfere with the proper action of the drag; and for the purpose of overcoming this difficulty, which sometimes results in the destruction of the whole mashing mechanism, I provide the friction-rollers.

The bottom of the tun is provided with an opening, which, when the mashing process has been finished and it becomes desirous to empty the tun, is opened, and the drag, having been placed in position, is caused to rotate by means of the axial shaft having been put in motion. The construction of the drag tends to throw the grains outward and over the opening through which they fall, whereby the tun is soon emptied.

One of the advantages that I claim for my invention is that the same can be attached by suitable means to any mash-machine now in use and without a great delay.

When not in use the drag is raised, and by suitable means held in that position.

Heretofore a machine for mashing brewers' mash has been constructed with a system of vertical shares attached to a horizontal shaft and revolving in a circular path around a vertical axis, and such machines have also been provided with a revolving horizontal shaft traveling around the vertical axis and carrying a series of radial rotating beaters; but such features are not claimed by me.

What I claim as new, and desire to secure by Letters Patent, is—

1. In a mash-tun, the combination, with a horizontal shaft arranged to revolve around a vertical axis, of a drag mounted loosely on such shaft, so as to bear on the material contained in the tun by its inherent gravity, in the manner described, substantially as set forth.

2. In a mash-tun, the combination, with a horizontal shaft arranged to revolve around a vertical axis and on its own axis, and with stirrers affixed to said shaft, of a drag mounted loosely on such shaft, so as to bear on the material contained in the tun by its inherent gravity, in the manner described, substantially as set forth.

3. In a mash-tun, the combination, with a horizontal shaft arranged to revolve around a vertical axis, of a drag mounted loosely on said shaft, so as to rest on the material contained in the tun by its inherent gravity, and a device for retaining said drag in an elevated position when it is not in use, substantially as described.

4. In a mash-tun, the combination, with a horizontal shaft arranged to revolve around a vertical axis, of a drag mounted loosely on said shaft and constructed with flat feet or bearing-surfaces to prevent the same from sinking too deep at a time into the material contained in the tun, substantially as described.

5. In a mash-tun, the combination, with a horizontal shaft, arranged to revolve around a vertical axis, of a gravitating drag loosely mounted on said shaft and provided with flat feet having attached friction-rollers, substantially as and for the purpose described.

6. In a mash-tun having an opening in its bottom, the combination, with a horizontal shaft arranged to revolve around a vertical axis, of a drag mounted loosely on said shaft by means of collars, said drag being provided with flat feet having anti-friction rollers adapted to bear against the inner surface of the tun as the drag travels with the shaft, substantially as described.

ANTHONY PFUND.

Witnesses:
ADAM E. SCHATZ,
J. RAUBITSCHEK.